United States Patent [19]

Matsumoto

[11] Patent Number: 4,893,345
[45] Date of Patent: Jan. 9, 1990

[54] METHOD FOR DETECTING/PROCESSING IMAGE INFORMATION

[75] Inventor: Fumio Matsumoto, Tokyo, Japan

[73] Assignee: Fuji Photo Film Co., Ltd., Kanagawa, Japan

[21] Appl. No.: 40,238

[22] Filed: Apr. 16, 1987

[30] Foreign Application Priority Data

| Apr. 28, 1986 | [JP] | Japan | 61-99208 |
| Apr. 30, 1986 | [JP] | Japan | 61-99875 |
| Apr. 30, 1986 | [JP] | Japan | 61-99876 |

[51] Int. Cl.⁴ .............................................. G06K 9/28
[52] U.S. Cl. .................................... 382/1; 355/41; 358/213.23; 382/65
[58] Field of Search ............... 382/1, 65; 358/54, 214, 358/215, 216, 213.22, 213.23; 353/26 A; 355/41

[56] References Cited

U.S. PATENT DOCUMENTS

| 4,602,289 | 7/1986 | Sekine | 358/213.22 |
| 4,610,537 | 9/1986 | Matsumoto | 355/68 |
| 4,611,907 | 9/1986 | Inatsuki | 355/41 |
| 4,627,719 | 12/1986 | Nitsch et al. | 355/41 |
| 4,650,316 | 3/1987 | Matsumoto | 355/55 |
| 4,652,928 | 3/1987 | Endo et al. | 358/213.23 |
| 4,659,213 | 4/1987 | Matsumoto | 355/38 |
| 4,660,965 | 4/1987 | Matsumoto | 355/41 |
| 4,666,306 | 5/1987 | Matsumoto | 355/38 |
| 4,666,307 | 5/1987 | Matsumoto | 356/404 |
| 4,667,245 | 5/1987 | Matsumoto et al. | 358/214 |
| 4,704,633 | 11/1987 | Matsumoto | 358/213.27 |
| 4,707,118 | 11/1987 | Terashita | 355/38 |
| 4,724,463 | 2/1988 | Matsumoto | 355/29 |
| 4,727,399 | 2/1988 | Matsumoto | 355/41 |
| 4,728,996 | 3/1988 | Matsumoto | 355/77 |
| 4,769,677 | 9/1988 | Matsumoto | 355/38 |
| 4,769,678 | 9/1988 | Komoda et al. | 355/39 |

*Primary Examiner*—Leo H. Boudreau
*Attorney, Agent, or Firm*—Wenderoth, Lind & Ponack

[57] ABSTRACT

In a photographic printing system, it is necessary to measure the density of an original film to determine its exposure value and to precisely control conveyance/suspension of the original film in order to optimally print the images of each frame. When an image sensor is used for measurement, the image sensor should have a relatively rough picture element density in order to perform the calculation of the exposure value at high speed, but should also have a fine density in order to precisely control the conveyance of the original film. In order to resolve the dilemma, image information from the original film is detected with an image sensor of a relatively low resolution, and then the resolution is increased by picture element pitch interpolation through moving the original film at a minute pitch, thereby achieving precise and fast detection and processing of image information.

12 Claims, 13 Drawing Sheets

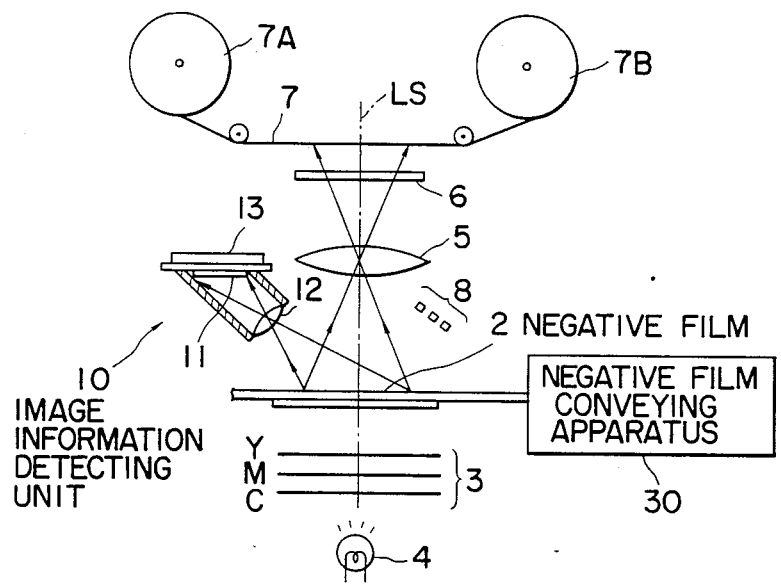
FIG. 1
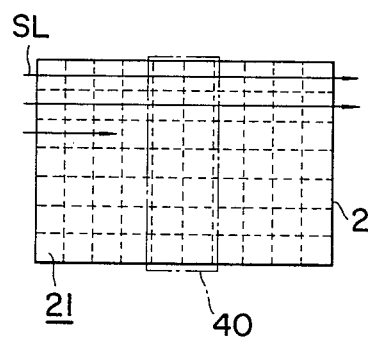
FIG. 2A
| 16 | 59 | 58 | 55 | | 43 | 31 |
|----|----|----|----|----|----|----|
| 12 | 57 | 56 | 55 | | 58 | 13 |
| 17 | 55 | 55 | 51 | | 56 | 16 |
| 15 | 52 | 52 | 47 | | 53 | 20 |
| 14 | 49 | 48 | 46 | | 49 | 23 |
| 12 | 47 | 46 | 45 | | 49 | 27 |
| 5  | 17 | 17 | 16 | | 45 | 30 |
FIG. 2B FIG. 4
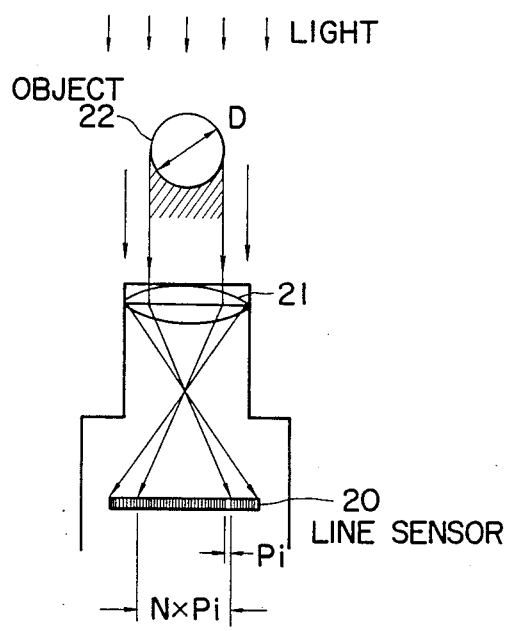
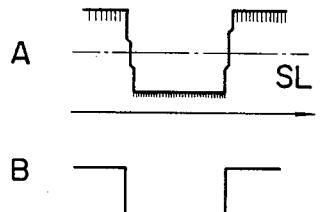

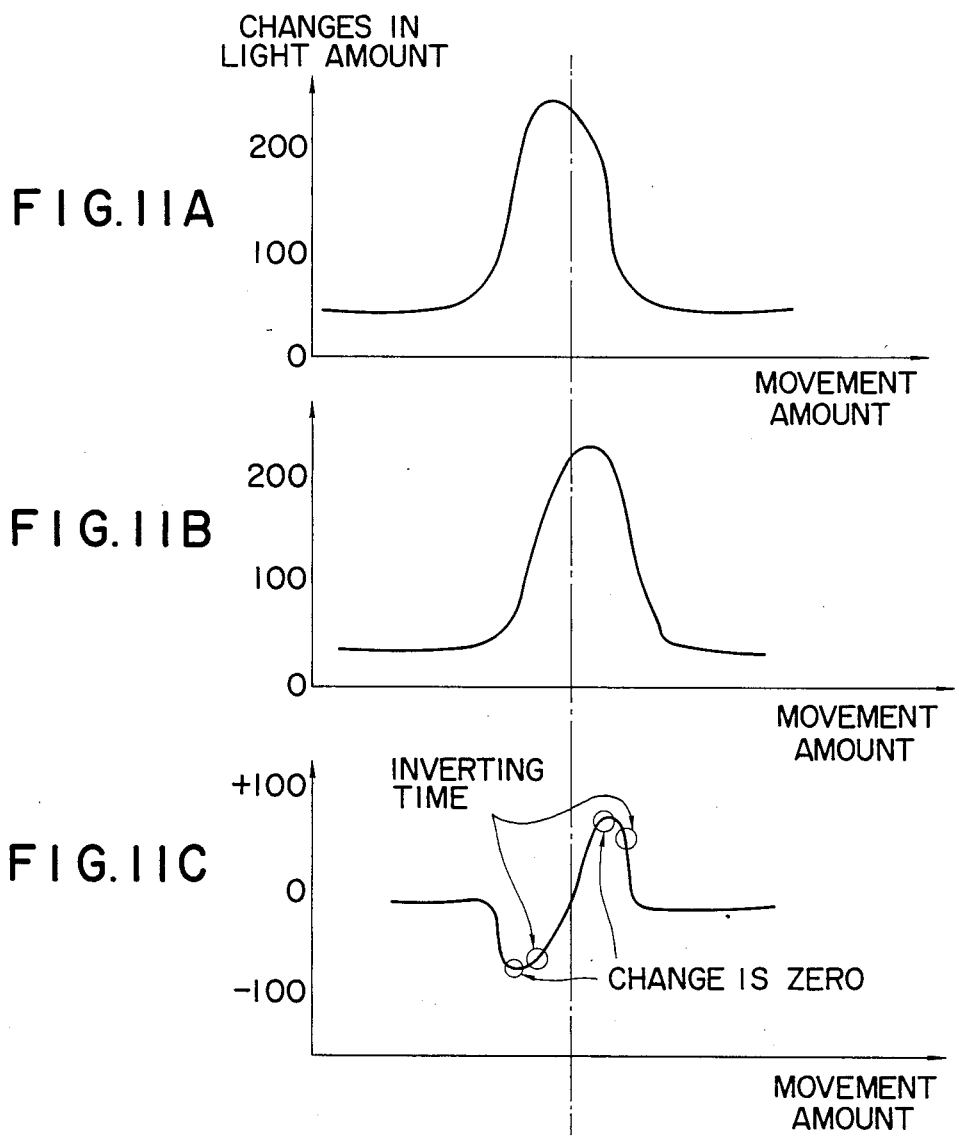

| FRAME NO. | DISTANCE ℓ | | DETECTION ERROR DT-R | FRAME NO. | DISTANCE ℓ | | DETECTION ERROR DT-R | FRAME NO. | DISTANCE ℓ | | DETECTION ERROR DT-R |
|---|---|---|---|---|---|---|---|---|---|---|---|
| | DETECTED VALUE DT AT LIGHT AMOUNT 65% | MEASURED VALUE R OF MOVEMENT | | | DETECTED VALUE DT AT LIGHT AMOUNT 65% | MEASURED VALUE R OF MOVEMENT | | | DETECTED VALUE DT AT LIGHT AMOUNT 65% | MEASURED VALUE R OF MOVEMENT | |
| 1 | 1.01 | 1.00 | +0.01 | 9 | 1.00 | 1.00 | 0.00 | 17 | 0.92 | 1.00 | -0.08 |
| 2 | 0.99 | 1.00 | -0.01 | 10 | 0.76 | 1.00 | -0.24 | 18 | 0.75 | 1.00 | -0.25 |
| 3 | 1.03 | 1.00 | +0.03 | 11 | 1.01 | 1.00 | +0.01 | 19 | 0.97 | 1.00 | -0.03 |
| 4 | 1.10 | 1.00 | +0.10 | 12 | 1.02 | 1.00 | +0.02 | 20 | 0.95 | 1.00 | -0.05 |
| 5 | 0.94 | 1.00 | -0.06 | 13 | 0.86 | 1.00 | -0.14 | 21 | 0.93 | 1.00 | -0.07 |
| 6 | 0.99 | 1.00 | -0.01 | 14 | 0.95 | 1.00 | -0.05 | 22 | 1.00 | 1.00 | 0.00 |
| 7 | 1.17 | 1.00 | +0.17 | 15 | 1.03 | 1.00 | +0.03 | 23 | 0.99 | 1.00 | -0.01 |
| 8 | 1.15 | 1.00 | +0.15 | 16 | 0.96 | 1.00 | -0.04 | 24 | 0.88 | 1.00 | -0.12 |

(UNIT mm)

FIG. 12

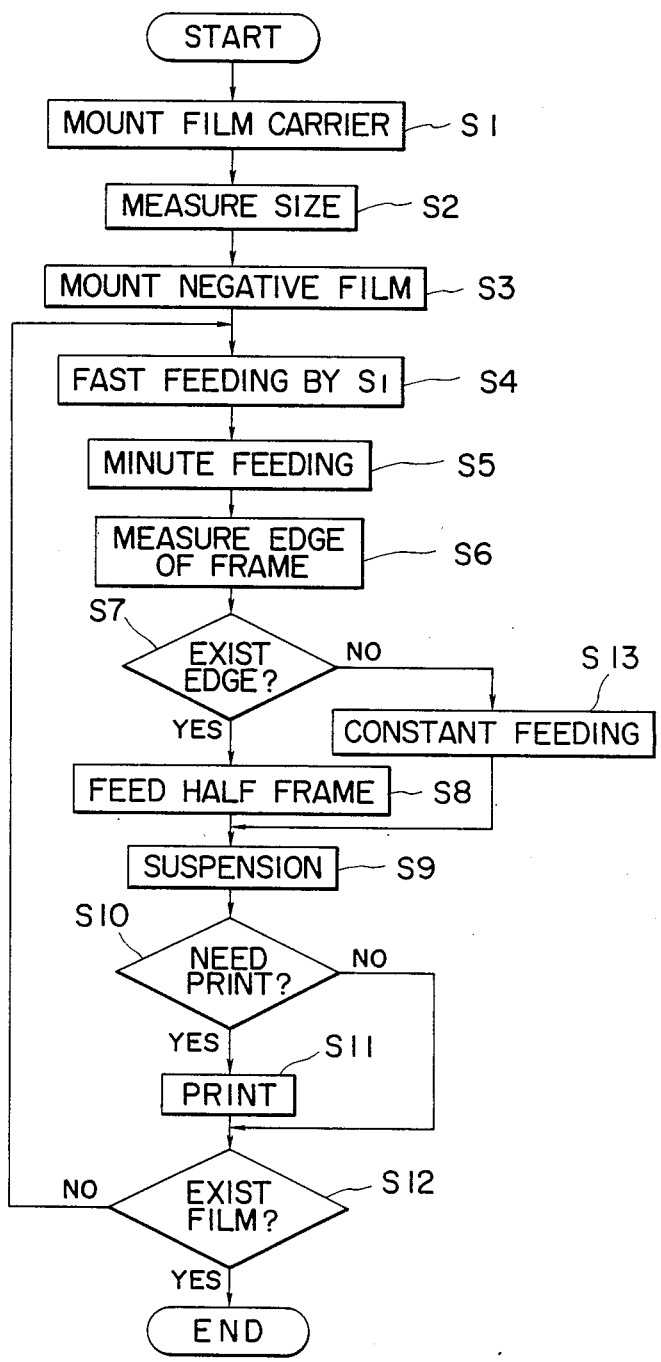
F I G. 14

METHOD FOR DETECTING/PROCESSING IMAGE INFORMATION

BACKGROUND OF THE INVENTION

This invention relates to a method for detecting/processing image information on an original film such as a roll of film negative which can detect and process image information with an image sensor having a relatively rough picture element density and which can detect an edge between imaged frames.

Photographic printing systems need to measure the density of an original film (e.g. a film negative sheet) in order to determine optimal printing exposure or correction amount. In the prior art, the average density of the film negative is photometrically measured with respect to its LATD (Large Area Transmittance Density) by means of photo sensors, such as photodiodes, provided near a light path in the photographic printing system. The prior art is defective, however, in that it can not accurately measure exposure or correction value because the image detection in the LATD method is intended to photometrically measure the film negative in average but not to precisely measure the image density across the whole surface of the film negative. The present applicant has filed applications which are laid-open under Japanese Laid-open Patent Nos. 154244/1985, 151631/1985 and 220325/1985 in order to solve the problem. But there arises a dilemma in that if the picture element density of an image sensor is increased, the costs for the image sensor as well as peripheral circuits will be pushed up and the time required for processing an exposure value, for example, is prolonged. For quick operation of the exposure value, for example, the picture element density of the image sensor is preferably to be relatively rough.

In a photographic printing system, it is further necessary to accurately position a frame of the original film on a photographic frame in order to suitably print images on a sheet of photographic paper. In the prior art, in the the case of the film sizes such as size 135, where frames and perforations do not correspond to a 1:1 relation, like 110 and 126 sizes do, for example, notches are cut on the sides of a sheet of the original film detected by photosensors and then used for positioning. This method, however, leads to trouble because the notches must be cut with utmost care in order to have an accurate correspondence with the frame positions. There is another positioning method which feeds a sheet of the original film according to prescribed distance, but positional deviations tend to accumulate to deteriorate the precision. Still another method proposes that photosensors such as photodiodes are arranged in correspondence to the shapes of frames to position the original film according to the states detected by photosensors and sequence of detection, but this method inconveniently requires a complicated structure and control algorithm. The method is further defective because the slit mask which is mounted in order to enhance resolution tends to lower the sensitivity.

In order to solve such problems, the present applicant has filed inventions related to methods under Japanese Laid-open Patent Nos. 196740/1985 and 185793/1985, but these methods are defective in that the density of these image sensors generally has to have a high resolution. This is because unless the edge between two imaged frames is detected at a high precision, the original film cannot be controlled accurately when being conveyed. The resolution may be increased by the method of pitch interpolation, but it takes a long time in image information detection because data is taken for every minute pitch and detected over a long span of frames. The method is detrimental to the speed of data processing as well as to the efficiency of works. It is especially inconvenient when the edges are detected for the film feeding because the whole feeding time amounts to a formidable extent.

SUMMARY OF THE INVENTION

This invention was contrived to eliminate the aforementioned problems encountered in the prior art and aims at providing a method for detecting/processing image information at a high precision and speed by detecting image information of the film negative with a two-dimensional image sensor of a relative rough resolution and by interpolating at a small pitch of feeding, thereby increasing the resolution thereof.

Another object of this invention is to provide a method for detecting/processing image information which can detect image information of the original film with an image sensor having a relative rough resolution and which can process the image information with an increased resolution.

Still another object of this invention is to provide a method for detecting/processing image information which can detect image information of the original film with an image sensor having a relative rough resolution, process the image information with an increased resolution and detect an edge between imaged frames at high speed.

According to one aspect of this invention, for achieving the objects described above, there is provided a method for detecting and processing image information by moving an original film and a two-dimensional sensor relatively to each other and photometrically measuring the images on the film with the two-dimensional sensor. The method is characterized in that outputs from the picture element arrays are detected at a pitch relatively smaller than the pitch used by the two-dimensional sensor and are processed to interpolate said picture element pitch. Data from the plural picture element arrays corresponding to a predetermined detectable scope are synthesized so as to thereby achieve detection of image information at high speed and a high resolution.

According to another aspect of this invention, there is provided a method for detecting and processing image information by moving an original film and a sensor relatively to each other, and photometrically measuring the images on the original film with the sensor. The method is characterized in that outputs from the picture element arrays are detected at a pitch relatively smaller than the picture element pitch on the sensor and are processed to interpolate the picture element pitch and to detect image information at a high resolution.

Further, according to still another aspect of this invention, there is provided a method for detecting and processing image information which is characterized by the steps of moving an original film and a sensor relatively to each other, photometrically measuring the image on the original film with the sensor, processing the outputs from the picture element arrays which are detected at a pitch relatively smaller than the picture element pitch of the sensor and interpolating the picture element pitch to obtain light value characteristics for controlling the conveyance of the original film.

Still further, according to another aspect of this invention, there is provided a method for detecting and processing image information which is characterized by the steps of moving an original film and a sensor relatively to each other, photometrically measuring images on the original film, processing the outputs from one or more than one of the picture element array(s) which are detected at a pitch smaller than the picture element pitch of the sensor, and detecting an edge of an imaged frame of the original film.

The nature, principle and utility of the invention will become more apparent from the following detailed description when read in conjunction with the accompanying drawings.

BRIEF DESCRIPTION OF THE DRAWINGS

In the accompanying drawings:

FIG. 1 is a structural view to show an embodiment of a photographic printing system to which this invention method is applied;

FIGS. 2A and 2B are explanatory views to show the correspondence between picture element segmentation and stored data;

FIGS. 4 and 5 are explanatory views to describe the principle of this invention;

FIGS. 10A, 10B and FIGS. 11A through 11C are views to respectively show the state of edge detection;

FIG. 12 is a table to show the result of actual measurement;

FIG. 14 is a flow chart to show an example of operations in detection and suspension.

DESCRIPTION OF THE PREFERRED EMBODIMENTS

Figure 3A:
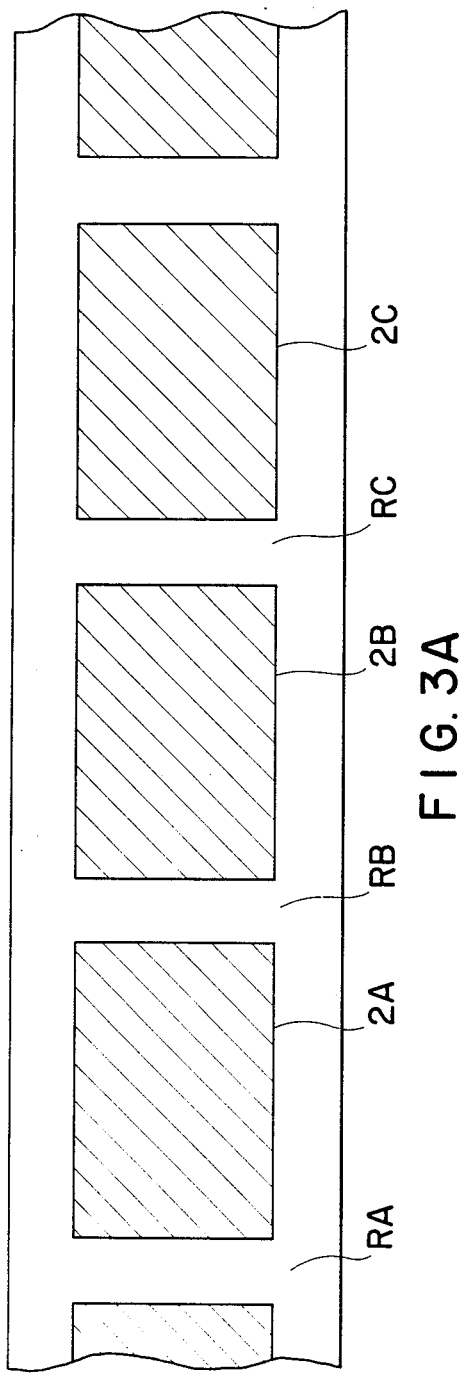
FIGS. 3A and 3B are views to show the relation between a film negative and image information.

Before going into detailed explanation of this invention, a photometric method for an original film such as a film negative will be described as a base of this invention. This applicant has proposed methods for detecting the film negative with an image sensor which are disclosed in Japanese Laid-open Patent Nos. 196740/1985 and 151633/1985, etc.

According to this invention as shown in FIG. 1, close to a film negative 2 at a printing section is provided an image information detecting unit 10 which includes a two-dimensional image sensor 11 of surface scanning type comprising CCD (Charge Coupled Device), for example, so that image information on the film negative 2 are segmented into a large number of picture elements and then detected. More particulaly, when predetermined driving signals are fed from a driving circuit (not shown) to the image sensor 11, the image sensor 11 receives the light which has transmitted through the film negative 2 placed at the printing section via a lens unit 12. The image sensor 11 divides the whole surface of the negative film 2 into a large number of well-ordered arrays of picture elements 21 as shown in FIG. 2A so that the frame can be scanned sequentially along scanning lines SL. An output register of the image sensor 11 sequentially outputs image signals in accordance with the scanning of the frame, the image signals sre sample-held by a sample-holding circuit (not shown), and the sample-held values are converted by an A/D converter into digital signals. The digital signals from the A/D converter are controlled by a write-in controller to be stored in memory in the arrangement corresponding to the picture elements 2A as shown in FIG. 2B and in anti-logarithmic digital values (or density values obtained by table conversion, for example) of the film negative 2.

Figure 3B:
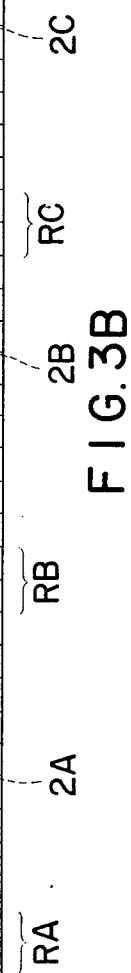

When a film negative 2 is conveyed to a printing section, imaged frames 2A, 2B, 2C, ... shown in FIG. 3A should be positioned precisely on a film negative carrier. After images on one frame are printed, the film negative 2 should be conveyed by one frame so as to position the subsequent frame at a right position. In order to register the movement of the film negative 2 with the position of the photographic printer, the film negative is conventionally notched at specific locations by a notcher so that the imaged frames are automatically suspended at prescribed positions. This invention method enables automatic detection not only of the image information of FIG. 3B for each picture element of the image sensor 11 from the film negative 2 shown in FIG. 3A, for example, to thereby detect the frames 2A, 2B, 2C, ... from the image information, but also of unimaged portions between the imaged frames RA, RB, RC, ... from the anti-logarithmic data thereof. The data, if combined with the size information, enables automatic detection/suspension of the frames. Since the resolution required for exposure correction operation is in the order of several mm on the film negative, an image sensor of a low resolution is preferable costwise as well as operationwise. However, the resolution required for detecting edges is as high as in the order of several 0.01 mm. As shown in FIG. 2A, according to this invention method, picture element arrrays 40 which are located at the center (or peripheral portion) of a two-dimensional image sensor 11 and which perpendicularly intersect the direction of the film negative 2 are electrically extracted and the edge between imaged frames is detected from these picture element arrays 40.

In the aforementioned detection with the image sensor 11, if a sensor having a high resolution is used, the capability of the edge detection would be increased, but since it requires a large number of picture elements, the time needed for calculating the exposure value, for example, would also increase. When the detection is conducted from the picture element arrays 40 shown in FIG. 2A, it would take much time to convey all the necessary frames until the number of picture elements fulfils the object scope. In order to resolve such a dilemma, this invention method conveys the film by a pitch as minute as a fraction by dividing one picture element by an integer, places the outputs from plural picture elements within the detectable scope for every pitch into memory as data, combines or synthesizes the data of plural picture element arrays in memory at the time when the conveyance is completed for one picture element (plural picture element data on the memory), and calculates for discrimination of the edge between the frames to increase the resolution. According to this invention method, even if the detectable scope is 5 to 10 picture element arrays, sufficient data can be taken in within the time which otherwise could only detect one picture element array. For instance, the time needed for detecting one picture element array by this invention, minute conveyance is assumed to be 20 milliseconds (in other words, as one pitch takes 2 milliseconds, ten pitches takes 20 milliseconds). It means a remarkable reduction of detection time as well as a noteworthy increase in the capability of the photographic printing system as other prior art systems usually take 100 to 200 milliseconds or 5 or 10 times as much as this invention method.

A photometric method with an image sensor such as a line sensor basically comprises the steps of binarizing the images of an object 22 (of the diameter D) focused on a line sensor 20 via a lens 21 as shown in FIG. 4 into binary values shown in FIG. 4B by the slice level SL in FIG. 4A to obtain the number N of picture elements or either bright or dark photoelectric elements (for instance the number is 1024 to 2048), calculating N X Pi setting the picture element pitch Pi as a constant (for example, 14 to 28μ), and then multiplying it with the magnification a of the lens 21 to obtain the size D of the object 22. The above photometric method has the following characteristics:

(1) The time needed for measurement is short (0.5 to 100 milliseconds).

(2) Since there is no movable part involved, the durability is almost permanent.

(3) The application as a no-contact measurement method is extremely wide.

(4) As long as it is used within the wavelength to which image sensors are sensitive, no restrictions are imposed on light.

(5) The allowable scope for position of the objects is wide. Due to the aforementioned various advantages, the method satisfies the requirements of on-line measurement which is indispensable for advanced technology. However, there still remains a factor for errors in various measurements because the method involves the steps of image picking as well as photo-electric conversion. More basically, the method is not completely free of problems since the measurement precision and measurement scope are restricted by the number of picture elements N and the picture element pitches Pi. In recent years, the picture elements can be segmented even more minutely to the extent of several μ pitches along the technological advancement in LSI manufacturing. But it is desirable in the field of processing for exposure or correction in photographic processings to segment a frame of images into picture elements on the order of several hundred points with the resolution in the order of several millimeters in order to extract the most conspicuous features of the picture as well as to reduce the cost and to process at quicker speed.

This invention enables reading a pitch between picture elements of the image sensor 11 by interpolation to achieve a resolution as high as ten of the picture element pitch Pi (in the unit of one tenth of millimeter) which is practically usable in edge detection of imaged frames of the film negative. Conventionally, when a dimension of an image is measured with an image sensor, it was generally thought impossible to have measurement precision higher than the pitch in picture elements. That was attributable to the fixed concept that image reading is performed digitally. In this invention interpolation method, picture element outputs are treated as continuous analog signals to detect minute changes in outputs.

Figure 5:
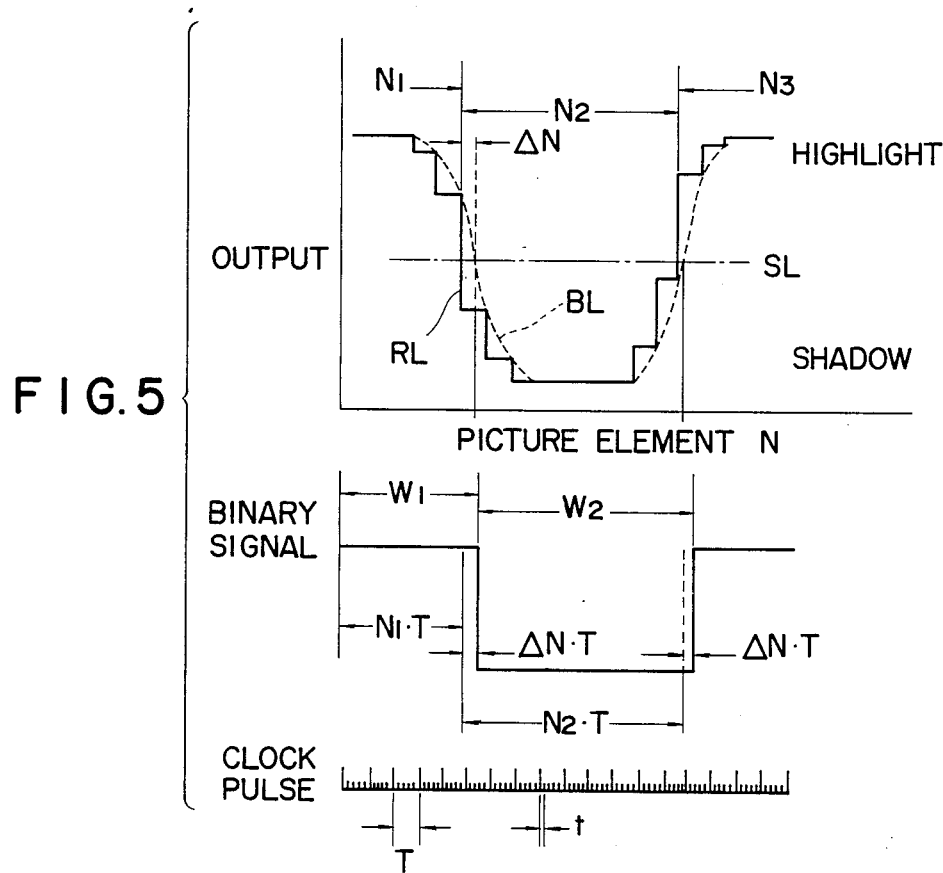

The method uses analog signals in combination with digital signals in a way comparable to a vernier of a vernier caliper. According to the principle of this invention, when the image sensor outputs a sample-held waveform in the stepped form as shown by the line RL in FIG. 5, the waveform becomes as shown by the broken line BL to thereby detect $\Delta N$ which is segmented smaller than a picture element. In the prior art, when the image sensor outputs such a waveform, it usually is sliced by the slice level SL to read picture elements in the number of $N_1$ and $N_3$ in highlight and in the number of $N_2$ in shadow. It is possible to obtain $\Delta N$ by detecting and converting in A/D the $N_1$-th picture element output and $(N_1+1)$-th picture element output and proportionally calculating the point of intersection with the slice level SL. However, the prior art method tends to complicate the circuits, needs longer time for calculation and presents a diffulty in precise detection of minute changes. This invention method is improved from the prior art in that $\Delta N$ can be detected in real time with a simple structure of circuits or in other words, this invention method can detect the picture element output in minute pitches as shown in FIG. 5 with broken line BL, and further detect edges between frames statistically by means of interpolated variable distribution. The output in picture element arrays detected with a pitch relatively smaller than the picture element pitch on the film negative is processed to detect the length of a binary signal based upon the interpolated signals as shown in $W_1$, $W_2$ and so on. The length of the signal $W_1$ in FIG. 5 can be calculated in the formula below.

$$W_1 = N_1 \cdot T + \Delta N \cdot T = T(N_1 + \Delta N) \tag{1}$$

If measured at the clock t, $$T = kt \tag{2}$$

the formula below holds from the formula (1), $$W_1 = kt(N_1 + \Delta N) \tag{3}$$

If k is 10, $\Delta N$ can be measured to the extent of the length of picture element 0.1 to obtain the interpolated measured values.

The technique will now be described in detail.

Figure 6:
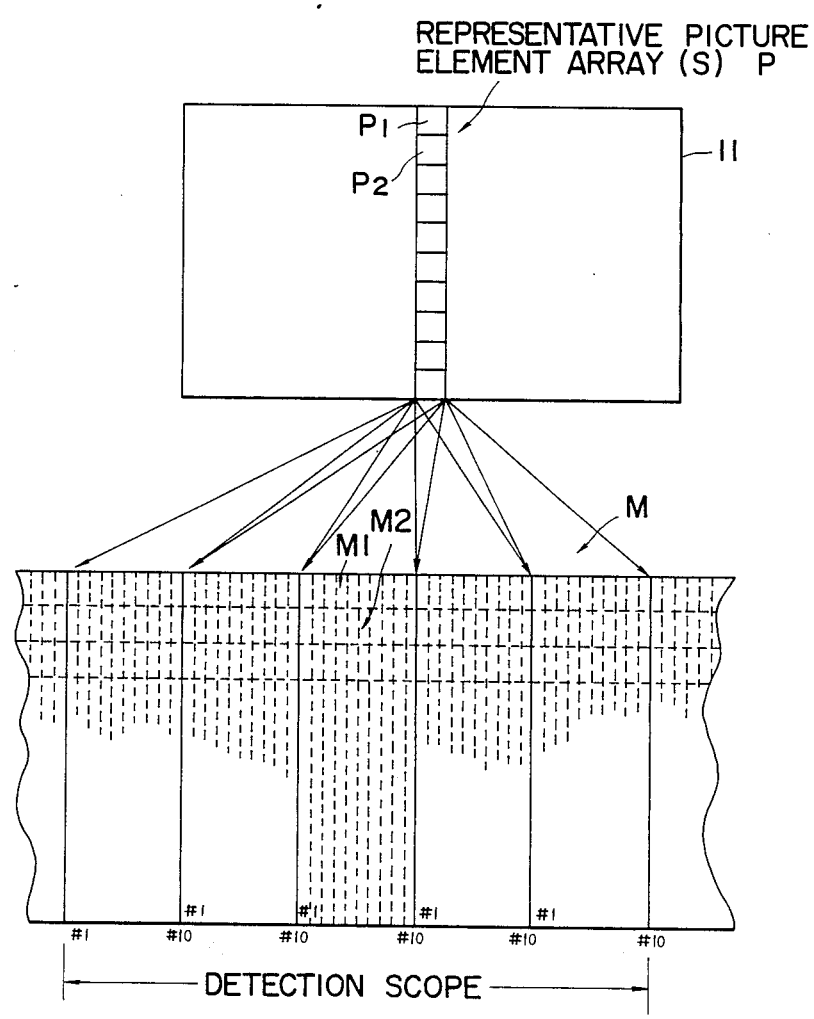
FIGS. 6 through 8 are views to explain the relationship between the detected data in the element arrays and the storing operation to memory according to this invention.
Figure 7:
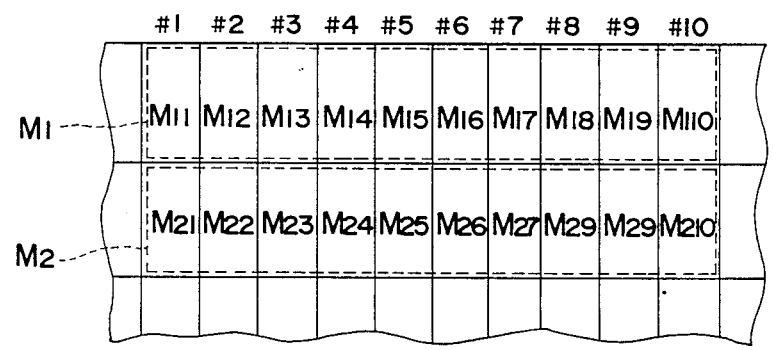
Figure 8:
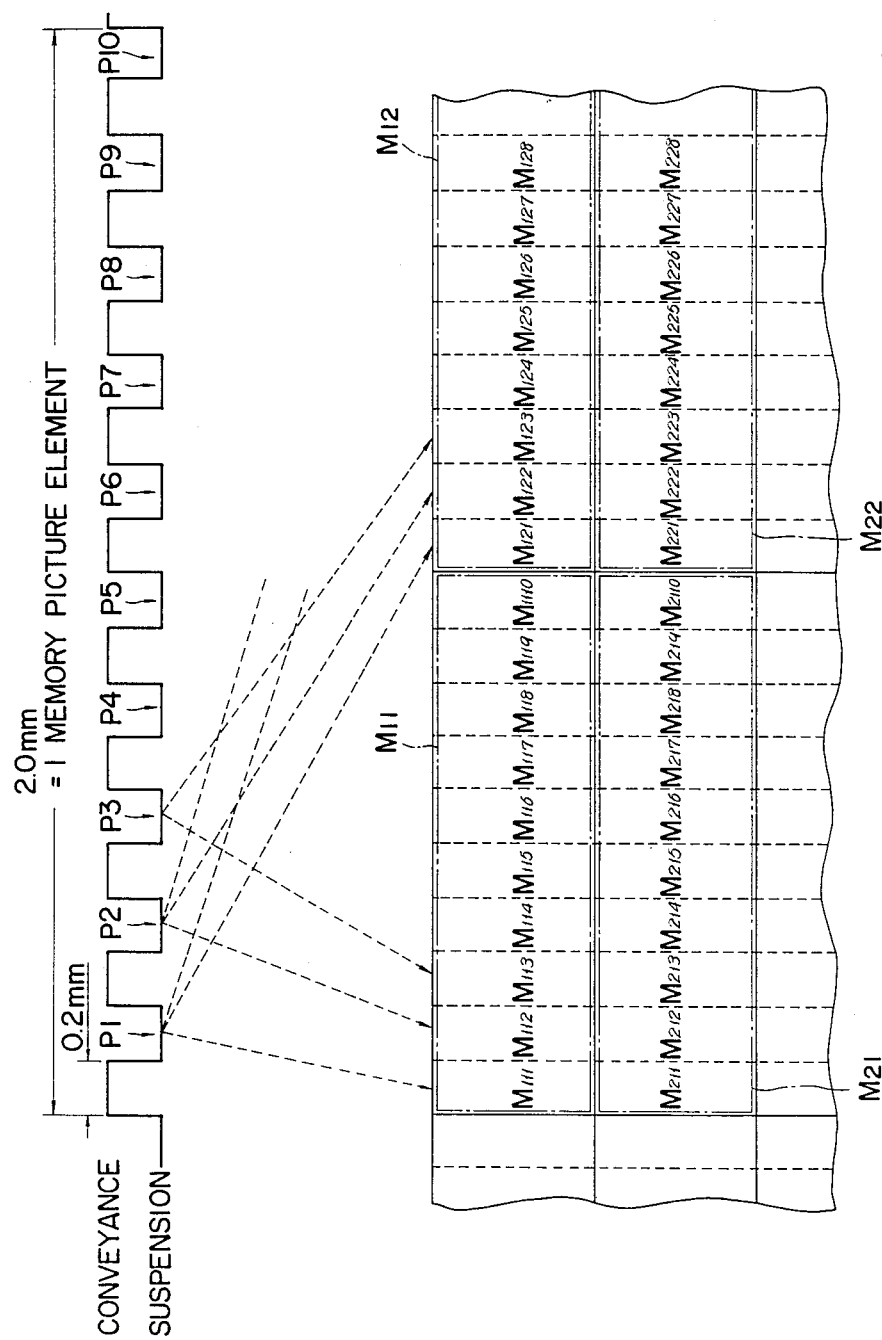

In this invention method as shown in FIG. 6, the data for one picture element in a memory comprising plural areas M (e.g. #1 through #10 picture elements) to correspond to one or more of representative picture element arrays(s) of a two-dimensional image sensor, a photodiode or a line sensor. More particularly, the memory data $M_1$ which corresponds to the light receiving picture element P1 extends from $M_{11}$ to $M_{110}$ while the memory data $M_2$ which corresponds to the light receiving picture element P2 extend from $M_{21}$ to $M_{210}$ as shown in FIG. 7. Similar correspondence applies to other light receiving picture elements $S_{ij}$ in the number of #1 through #10. As shown in FIG. 8, if it is assumed that the length of the film negative which is required to provide data across one data area on the memory is 2.0 mm, and if the one time conveyance moves the film negative by 0.2 mm, then it would need ten time conveyances, and during suspensions P1 to P10 between each conveyance the film negative is photometrically measured with a two-dimensional image sensor. By a one time detection with the image sensor, data is obtained with the segmented picture elements as shown in FIG. 2B. According to this invention as shown in FIG. 8, the data obtained by photometry on P1 are stored in the areas of the memory $M_{111}$, $M_{121}$, $M_{131}$, ..., $M_{212}$, $M_{221}$, $M_{231}$, ... and subsequent data are stored sequentially in corresponding areas. Accordingly, by the time the film negative has been conveyed by 2.0 mm and the data obtained by the photometry at P10 have been stored in the memories $M_{1110}$, $M_{1210}$, ..., $M_{2110}$, $M_{2210}$, ..., data are stored in all the memory areas corresponding to the predetermined detection scope.

Figure 9:
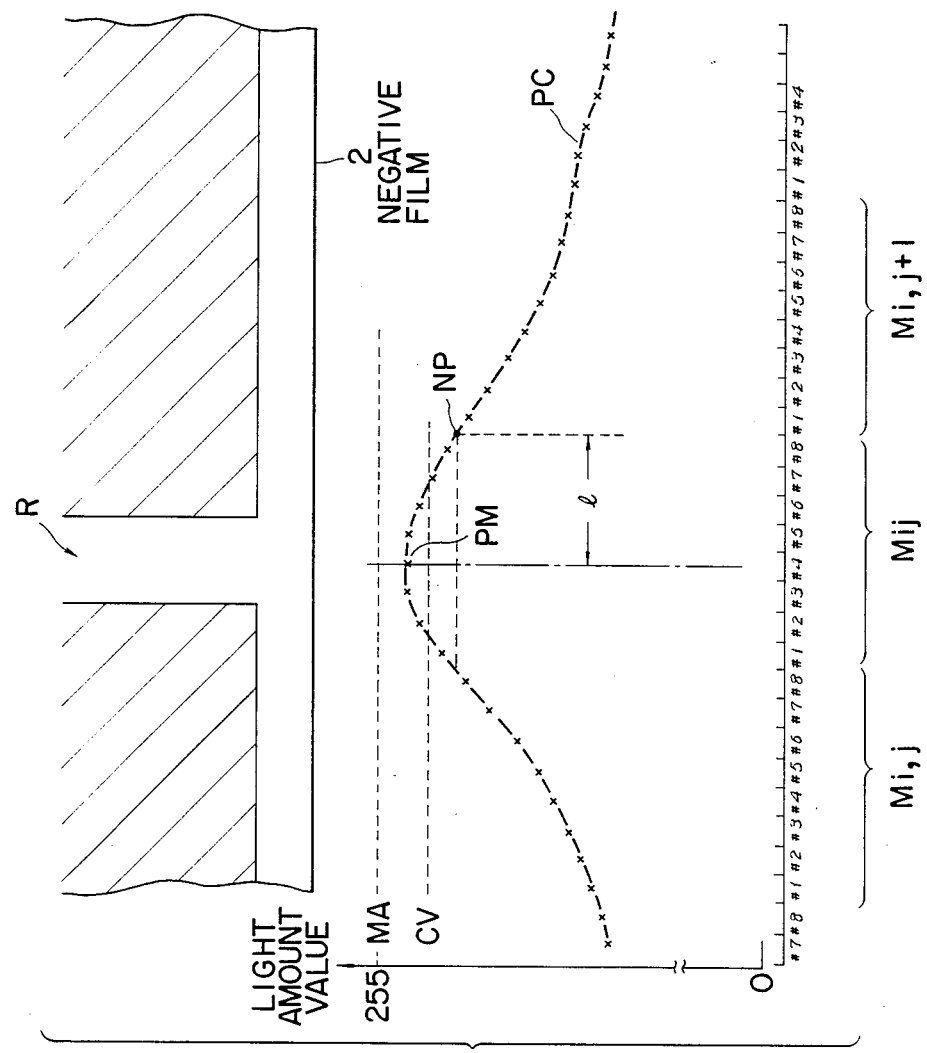
FIG. 9 is an explanatory view to show synthesizing of detected data.

Then as shown in FIG. 9, the picture element array data or the image data detected by interpolating the pitches of the film negative 2, may be processed to calculate the light value characteristic PC thereby detecting the edge and the unimaged portion between two imaged frames on the film negative 2. The maximum PM of the light value characteristic PC should remain in the scope from the base light value MA and a threshold CV (e.g. 80%) which is lowered from the maximum by a predetermined ratio. This is because the edge of a frame stands on the boundary between an imaged frame and an unimaged portions and has a light amount generally larger than the prescribed threshold CV. Further, the distance l from the maximum PM to the point where the light amount starts decreasing or the point where the curve of the characteristic PC comes in negative should be a predetermined distance (e.g. 1 mm) or more. This is because an edge of a frame always exists after an unimaged portion, and because a noise component should be removed. The scope may have an allowable width. Moreover, the light value NP at the distance l from the maximum PM corresponds to the edge of an imaged frame and should remain within a scope apart from the maximum PM by a certain ratio. This indicates that the light value at this distance is always smaller than the maximum PM and the inclination of the curve should be larger than a certain value. In the case where the difference between the light value NP at this point and the maximum PM is small, it would be extremely difficult to distinguish images from the unimaged portions. In such a case, the film negative is conveyed by a predetermined distance. When all of the aforementioned three conditions are met, an edge is judged to have been detected. In this example, the anti-logarithmic value of the light value is obtained in 8 bits ("0" through "255").

Figure 10A:
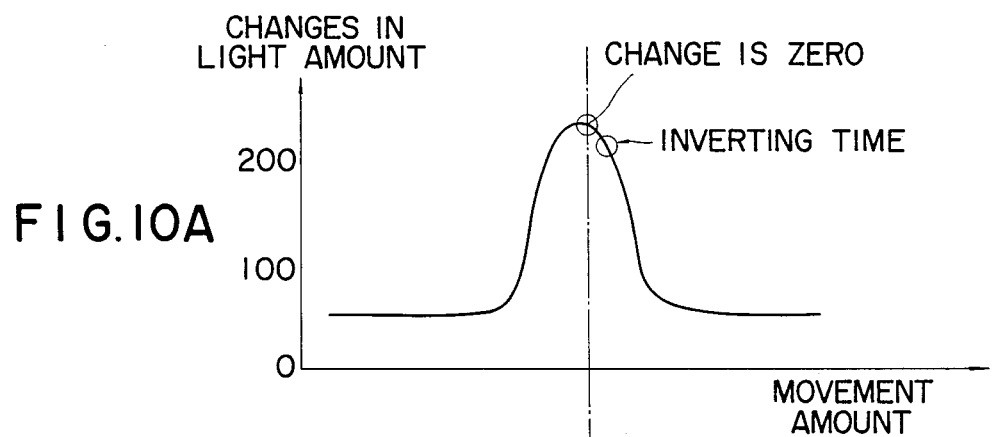
Figure 10B:
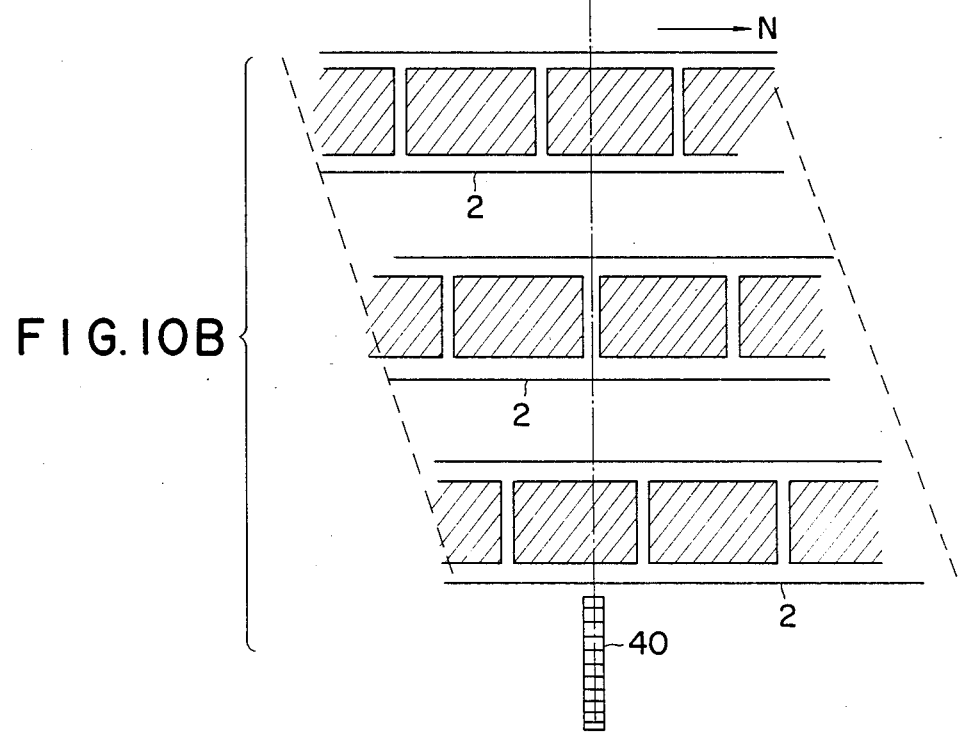

The edge is detected in the steps as shown in FIGS. 10A, 10B and FIGS. 11A through 11C. More particularly, FIG. 10A shows the changes in time series (changes in light value) of the picture element array 40 of an image sensor which are detected while the film negataive 2 is being conveyed at a minute pitch as shown in FIG. 10B. An unimaged portion between imaged frames can be, therefore, detected as the point where the change becomes zero. In FIG. 11, FIGS. 11A and 11B denote the sensor outputs of adjacent two picture element arrays. FIG. 11C shows the difference between the two arrays or the difference (B)−(A). The unimaged portion between imaged frames may be detected from the point where such a change becomes zero, and an edge from the point where the inclination of the curve is reversed.

FIG. 12 is a table to show an example of data on errors caused between detected edges by the aforementioned algorithm and actually measured values of a negative film (frames #1 through #24). In this example, there are listed the values DT (in unit mm) detected at the point where the light value is NP and which is lower than the maximum value PM by 65% or removed therefrom by the distance l, the values R (in unit mm) actually measured at the point removed from the maximum value PM by the distance l and the difference or error (DT−R) therebetween. As is obvious from the table, the errors exist substantially within the scope of ±0.2 −0.3 mm. Considering that the precision required for the positioning of a frame is about ±0.5 mm, the errors stay sufficiently within practical allowance.

Figure 13:
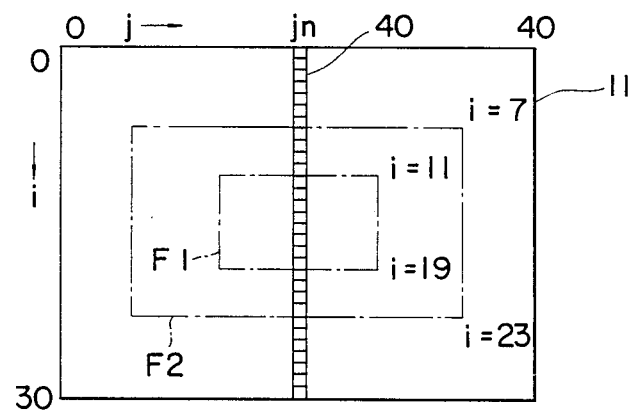
FIG. 13 is an explanatory view of a usable scope of picture element arrays.

In automatic controlling of the conveyance of frames, since the size of a frame has been known either by measurement or data input, a detection area for image information is selected and aforementioned picture element array 40 is extracted depending on the frame size as shown in FIG. 13. If the picture elements of the image sensor 11 comprises j-array (1 to 40)×i-array (1 to 30), a zone F2 is chosen for a 135 F type size while a zone F1 is chosen for 110 type size film. Setting a measured value $TS_{ij}$ of an element $S_{ij}$ of the image sensor 11 an anti-logarithmic value at a sampled point extracted at jn-th in the j-array. In the case of 135 F type size film, s the average value $\overline{T}$ is 23−7=16, the relation below holds.

$$\overline{T} = \sum_{i=7}^{23} TS_{i,jn}/16 \qquad (4)$$

In the case when the film negative 2 is detected with a minute pitch, the anti-logarithmic value $THS_{135F}$ of the size 135 F type at an adjacent point can be calculated from the following formula:

$$THS_{135F} = \frac{\sum_{i=7}^{23} TS_{i,jn} + \sum_{i=7}^{23} TS_{i,jn+1} + \cdots}{16} \qquad (5)$$

In the case of the size 110 type, the average value e,ovs/T/ will be calculated as below since 19−11=8 shows the picture element;

$$\overline{T} = \sum_{i=11}^{19} TS_{i,jn}/8 \qquad (6)$$

When the film negative 2 is detected with minute pitches, the anti-logarithmic value $THS_{110}$ of the size 110 type at an adjacent sampling point can be obtained from the following formula.

$$THS_{110} = \frac{\sum_{i=11}^{19} TS_{i,jn} + \sum_{i=11}^{19} TS_{i,jn+1} + \cdots}{8} \qquad (7)$$

By sampling those measured values to obtain frequency distribution, a curve of anti-logarithmic values PC can be obtained as shown in FIG. 9.

As described in the foregoing, every time the film negative 2 is conveyed for one picture element, as shown in FIG. 9, an area in proximity to the unimaged portion between frames within a predetermined detection scope can be obtained in a relatively enlarged form and at a high resolution to thereby enable detection of the unimaged portion and of the edge of an imaged frame. This can control precise conveyance of the film negative to position the imaged frames at the right position.

The edge detection of the imaged frames may be utilized in controlling conveyance of the film negative. The method will be described by referring to one embodiment. The method disclosed in Japanese Laid-open Patent No. 196740/1985 may be used.

FIG. 14 is a flow chart of an example of the detection/suspension method for imaged frames. A film negative carrier of the size corresponding to the size of the film negative 2 is mounted at a prescribed position of the printing section (Step S1), and the size of an aperture of the film negative carrier is measured with the image sensor 11 by a method, for instance, disclosed in Japanese Laid-open Patent No. 151626/1985. The size may be measured visually. According to the information of the measured size, the length of the film negative 2 to be moved is determined, selection/extraction of the picture element arrays 40 is automatically performed, and the exposure value in photographic printing or correction value thereof is controlled.

Figure 15:
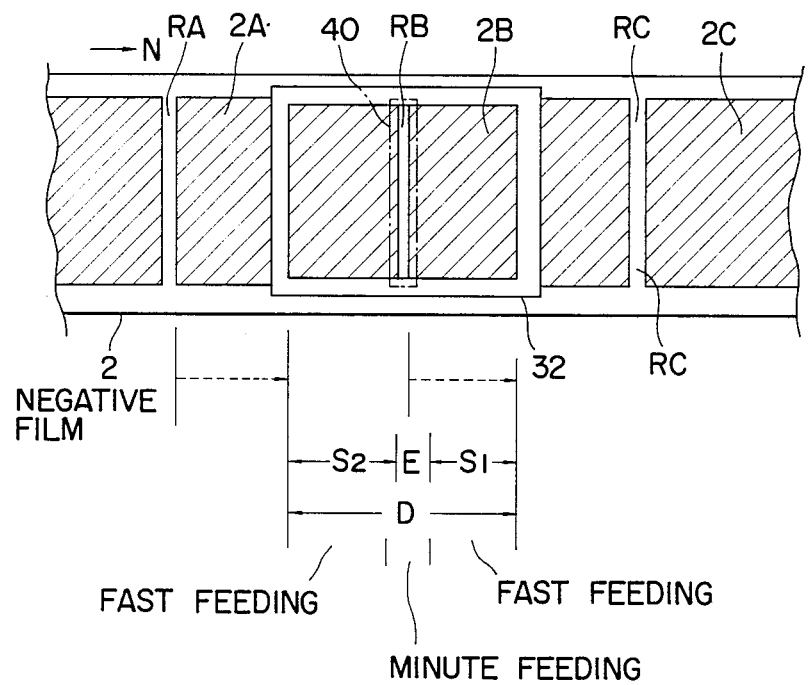
FIG. 15 is a view to show the state of a film negative carrier.

The film negative 2 for printing is then mounted at a position where an unimaged portion at the tip end of the film negative is substantially corresponding to the aperture of the film negative carrier (Step S3), and when the tip end of the film negative 2 is mounted on a drive roller, a pulse motor is actuated to move the negative film 2 by the distance $S_1$ which is slightly shorter than the interval distance D between frames at fast speed (Step S4). Then, the film negative 2 is fed by a minute pitch (Step S5), and meanwhile image information is detected by the image sensor 11 to detect the edges between frames as mentioned above. FIG. 15 shows the state mentioned above wherein the film negative 2 is being conveyed in the direction N toward the printing section to detect an unimaged portion RB between frames in the picture element array 40 of the image information detecting unit 10. The picture element array 40 is adapted to be positioned at the center of the aperture of the film negative carrier 32.

The film negative 2 is conveyed continuously at a minute pitch until an edge between frames is detected (Step S5). When an edge between an imaged frame 2A and an unimaged portion RB is detected, the film negative 2 is fed at a faster speed (Steps S6, S7, S8) for the distance $S_2$ needed for positioning the frame at the printing section which is learned from the size information obtained by the size measurement (Step S2), and then is suspended (Step S9). The distance E, from the end of faster feeding $S_1$ to the position where the edge between the unimaged position RB interposed between the image frames 2A and 2B, which are positioned at substantially the center of the film negative carrier 32, to the point where the imaged frame 2A is detected, is a parameter (a variable) for correcting fluctuations in distances. Therefore, if the film negative 2 is conveyed by the feeding distance of the imaged frame 2A, or $D = S_1 + E + S_2$, the imaged frames of the film negative 2 can finally be positioned precisely at the printing section in the state of FIG. 15.

After conveyance and suspension of the film negative 2, the particular imaged frame which is positioned at the printing section is discriminated by whether or not it is suitable for the photographic printing (Step S10). If it is judged not suitable, the procedure will skip one step and go to the Step S12, but when it is judged suitable, the images on the particular frame are printed with the exposure value and correction value which have been determined (Step S11). Then whether or not unprinted portion of the film negative 2 is still left is judged, and the film negative 2 is conveyed at a faster speed for the distance slightly shorter than one half of the interval distance between frames in accordance to the size information obtained at the above Step S2 (Step S12, S4). By repeating the above mentioned conveying and suspending steps, images in the frames can be sequentially and automatically printed. If there is no more length of the film negative 2 left unprinted at the Step S12, the rotation of the driving roller is automatically suspended to finish the process. Although the image information is detected from the center portion of the frame of the film negative positioned on the film negative carrier in the above embodiment, they may be detected from the proximity of the center or in the peripheral portions of the frame.

Although the number of areas on the memory is 10 in correspondence to the picture element arrays in the above embodiment, the number may be selected arbitrarily so long as it corresponds to the pitch used for minute feeding of the film negative. The ij of the detection scope in FIG. 13 may be arbitrarily chosen. Antilogarithmic values are used in the foregoing description, but the light value may be processed in density values. Further, although data are detected by a two-dimensional image sensor in the foregoing statement, the sensors applicable to this invention method are by no means limited a to CCD or MOS type two-dimensional image sensor, and photodiodes or a line sensor may be arranged to cover a predetermined detection scope.

According to this invention method as described in the foregoing statement, a higher resolution can be achieved with image sensors having a relatively low resolution, and conveyance of the film for the distance corresponding to one picture element can achieve the same effect as the detection of all the predetermined detection scope. This invention method, therefore, can detect and position imaged frames precisely, automatically, and speedily to realize photographic processing at higher efficiency and accuracy.

This invention method can achieve a high resolution even with sensors having a relatively low resolution, and use such sensors for exposure controlling. Although a simple algorithm or discrimination condition is used for edge detection, this invention method can attain precise detection of edges.

It should be understood that many modifications and adaptations of the invention will become apparent to those skilled in the art and it is intended to encompass such obvious modifications and changes in the scope of the claims appended hereto.

What is claimed is:

1. A method for detecting and processing image information comprising the steps of: moving an original film and a two-dimensional sensor relatively to each other; photometrically measuring images on said original film with said two-dimensional sensor; wherein outputs from picture element arrays, detected at a relatively smaller pitch than the pitch of said two-dimensional sensor, are processed to interpolate a picture element pitch; and, wherein data from plural said picture element arrays corresponding to a predetermined detection scope are synthesized to thereby achieve detection of image information at high speed and a high resolution.

2. A method for detecting and processing image information as claimed in claim 1 wherein said relatively smaller pitch is obtained by dividing one picture element pitch by an integer.

3. A method for detecting and processing image information as claimed in claim 1 wherein an edge of an imaged frame on said original film is detected by synthesizing the data of plural said picture element arrays, and said original film is controlled in conveyance by this edge detection.

4. A method for detecting and processing image information as claimed in claim 1 wherein said two-dimensional sensor is an image sensor.

5. A method for detecting and processing image information comprising the steps of: moving an original film and a sensor relatively to each other; photometrically measuring images on said original film with said sensor; wherein outputs from picture element arrays, detected at a relatively smaller pitch than the pitch of said sensor, are processed to interpolate a picture element pitch to detect image information at a high resolution.

6. A method for detecting and processing image information as claimed in claim 5 wherein said sensor is an image sensor.

7. A method for detecting and processing image information as claimed in claim 5 wherein said sensor doubles as the sensor for determining exposure or correction amount.

8. A method for detecting and processing image information comprising the steps of: moving an original film and a sensor relatively to each other; photometrically measuring images on said original film with said sensor; processing outputs from picture element arrays, detected at a pitch relatively smaller than the pitch of said sensor; and, interpolating said picture element pitch to obtain light amount characteristics for controlling conveyance of said original film.

9. A method for detecting and processing image information as claimed in claim 8 wherein an edge of an imaged frame of said original film is detected by examining a maximum of said light value characteristics relative to a base light value of said original film and a first threshold value, examining a negative inclination of a curve of said light amount characteristics relative to a predetermined distance scope, and examining the light value at a predetermined distance relative to second and third threshold values based on said maximum of said light value characteristics.

10. A method for detecting and processing image information as claimed in claim 8 wherein said sensor doubles as the sensor for determining exposure or correction amount.

11. A method for detecting and processing image information as claimed in claim 8 wherein said sensor is an image sensor.

12. A method for detecting and processing image information comprising the steps of: moving an original film and a sensor relatively to each other; photometrically measuring images on said original film; processing outputs from one or more than one picture element array(s), detected at a pitch smaller than the picture element pitch of said sensor; and, detecting an edge of an imaged frame of said original film.

* * * * *